US011116230B2

(12) United States Patent
Zhang et al.

(10) Patent No.: US 11,116,230 B2
(45) Date of Patent: Sep. 14, 2021

(54) TECHNOLOGY FOR THREE-DIMENSIONAL MICROWAVE AIR-JET DRYING OF PERSIMMON SLICES

(71) Applicants: SDIC ZHONGLU FRUIT JUICE CO., LTD., Beijing (CN); RUSHAN ZHONGCHENG FRUIT JUICE BEVERAGE CO., LTD, Weihai (CN)

(72) Inventors: Jiming Zhang, Beijing (CN); Chuanzhu Leng, Beijing (CN); Gang Xin, Beijing (CN); Nan Jiang, Beijing (CN); Xinfei Song, Beijing (CN); Jing Jin, Weihai (CN); Xiangyang Zheng, Weihai (CN); Sixin Wang, Beijing (CN); Baoshuang Tian, Beijing (CN); Chongxiao Shao, Beijing (CN); Meijun Du, Beijing (CN); Xihong Li, Beijing (CN); Xiaoyu Jia, Beijing (CN)

( * ) Notice: Subject to any disclaimer, the term of this patent is extended or adjusted under 35 U.S.C. 154(b) by 0 days.

(21) Appl. No.: 16/858,629

(22) Filed: Apr. 25, 2020

(65) Prior Publication Data

US 2021/0022357 A1   Jan. 28, 2021

(30) Foreign Application Priority Data

Jul. 26, 2019   (CN) .......................... 201910682451.0

(51) Int. Cl.
| | | |
|---|---|---|
| A23B 7/01 | (2006.01) | |
| A23L 19/00 | (2016.01) | |
| A23L 5/30 | (2016.01) | |
| A23B 7/022 | (2006.01) | |
| A23B 7/10 | (2006.01) | |
| A23L 3/42 | (2006.01) | |
| A23L 3/54 | (2006.01) | |
| A23N 7/02 | (2006.01) | |
| A23B 7/02 | (2006.01) | |
| A23L 3/01 | (2006.01) | |

(52) U.S. Cl.
CPC .............. *A23B 7/01* (2013.01); *A23B 7/022* (2013.01); *A23B 7/0205* (2013.01); *A23B 7/10* (2013.01); *A23L 3/01* (2013.01); *A23L 3/42* (2013.01); *A23L 3/54* (2013.01); *A23L 5/34* (2016.08); *A23L 19/03* (2016.08); *A23N 7/023* (2013.01); *A23V 2002/00* (2013.01); *A23V 2300/10* (2013.01)

(58) Field of Classification Search
CPC .. A23B 7/01; A23B 7/022; A23B 7/10; A23B 7/0205; A23L 19/03; A23L 3/42; A23L 5/34; A23L 3/54; A23L 3/01; A23V 2002/00; A23V 2300/10; A23V 2250/032; A23V 2250/08; A23N 7/023
USPC .......................................................... 426/242
See application file for complete search history.

(56) References Cited

U.S. PATENT DOCUMENTS

| | | |
|---|---|---|
| 7,569,244 B2 | 8/2009 | Jordan |
| 2009/0214735 A1 | 8/2009 | Wu |
| 2017/0265508 A1 | 9/2017 | Roy et al. |

FOREIGN PATENT DOCUMENTS

| | | | | | |
|---|---|---|---|---|---|
| CN | 1376407 | A | * | 10/2002 | |
| CN | 103695283 | A | * | 4/2014 | |
| CN | 103759506 | A | | 4/2014 | |
| CN | 103900358 | A | * | 7/2014 | |
| CN | 104351594 | A | * | 2/2015 | |
| CN | 105192240 | A | * | 12/2015 | |
| CN | 105249320 | A | | 1/2016 | |
| CN | 105249337 | A | * | 1/2016 | |
| CN | 105557977 | A | * | 5/2016 | |
| CN | 105685340 | A | * | 6/2016 | |
| CN | 105876687 | A | * | 8/2016 | |
| CN | 107373486 | A | * | 11/2017 | |
| CN | 107744115 | A | * | 3/2018 | |
| CN | 108157757 | A | * | 6/2018 | |
| CN | 109329384 | A | * | 2/2019 | |
| EP | 0223111 | A1 | * | 5/1987 | ............... A23B 7/00 |
| EP | 0706762 | A2 | * | 4/1996 | ............... A23B 7/01 |
| JP | 2016047039 | A | * | 4/2016 | |
| KR | 20030032704 | A | * | 4/2003 | |
| KR | 20150017619 | A | * | 2/2015 | |

* cited by examiner

*Primary Examiner* — Drew E Becker
*Assistant Examiner* — Austin Parker Taylor

(57) ABSTRACT

The present invention relates to a method for three-dimensional microwave air-jet drying of persimmon slices, comprising steps of grading and cleaning, slicing, microwave heating, steam de-astringency, hot-air reverse primary drying, negative-pressure intermittent secondary drying, cooling and packaging. In the present invention, high-temperature (60-70° C.) high-pressure annularly sprayed citric acid and 40% alcohol vapor (rotating at 360°) are adopted to remove astringency of persimmons, wherein high temperature causes more intense Brownian motion of liquid molecules; high pressure improves permeation and diffusion speed of de-astringency liquid in the persimmon slices; citric acid plays a membrane breaking role on persimmon cell membranes; and 40% alcohol vapor is allowed to rapidly diffuse into cells, so that tannin is polymerized into insoluble gel from a soluble state, thereby achieving a uniform and rapid de-astringency effect.

2 Claims, No Drawings

TECHNOLOGY FOR THREE-DIMENSIONAL MICROWAVE AIR-JET DRYING OF PERSIMMON SLICES

CROSS-REFERENCE TO RELATED APPLICATIONS

This application claims priority to Chinese Patent Application No. 201910682451.0 with a filing date of Jul. 26, 2019. The content of the aforementioned applications, including any intervening amendments thereto, are incorporated herein by reference.

TECHNICAL FIELD

The present invention belongs to the field of production of persimmon slices, and particularly relates to a technology for three-dimensional microwave air-jet drying of persimmon slices.

BACKGROUND OF THE PRESENT INVENTION

Persimmon is a perennial deciduous fruit tree of ebenaceae diospyros L.f, originated in China, and has been cultivated for more than 1,000 years. Persimmon is a fruit that people prefer to eat, and is sweet, greasy, delicious and nutrient-rich. Many people also like to eat frozen persimmons with another taste in winter. Persimmon is high in nutritional value and rich in carotene, riboflavin, vitamins and other trace elements. The content of vitamins and sugar in persimmon is 1-2 times higher than that of common fruits. If a person eats one persimmon a day, the vitamin C intake can basically meet half of daily requirement. Therefore, it is beneficial for human health to eat persimmons.

Dried persimmon slices are desserts prepared by slicing and drying persimmons as main raw materials and are popular with the general public in recent years. With the increase of yield of persimmons year by year, the market price of fresh persimmons and dried persimmons continues to decrease. However, the persimmons are high in moisture content, obvious in seasonality, and easy to rot and deteriorate after ripening. The persimmons are mainly fresh-eaten and processed into dried persimmons in a single variety. Therefore, it is urgent to perform profound processing on the persimmons, increase the variety of persimmon products, prolong the supply period of persimmon products and increase the added value of the products.

The prior art has disadvantages below when producing the persimmon slices.

1. Browning is easy to occur, mainly because cut surfaces of the persimmons are mechanically damaged and catalytically oxidized by polyphenol oxidase in aerobic conditions during slicing so that the cut surfaces of the persimmons become dark and the processed products have relatively poor quality.

2. The de-astringency of the persimmons is uneven, incomplete and inefficient. Because the traditional soaking de-astringency technology has great limitations and the speed and the concentration of de-astringency liquid permeating from the exterior to the interior are gradually decreased due to the fence effect of persimmon cells, the internal de-astringency effect is not obvious and the time for complete de-astringency is relatively long.

3. The apparent quality of persimmons is relatively poor. In the traditional drying technology, the temperature uniformity is not well controlled, causing inconsistency of surface evaporation rate and internal moisture migration rate of the persimmon slices as follows: when the surface evaporation rate is higher than the internal moisture migration rate, the outer surfaces are dry and hard while the interiors are wet and soft due to relatively rapid surface hardening of the persimmons; and when the surface evaporation rate is lower than the internal moisture migration rate, the drying time is too long.

4. The persimmon slices have poor rehydration property and taste. The uneven drying treatment results in different dehydration degrees of the persimmon cells and uneven pore size between cells, so that the rehydration property is poor.

5. The persimmons have long drying time and low production efficiency. A common drying mode of the persimmons is high-temperature baking or low-temperature freeze-drying, which requires a lot of time, has relatively low production efficiency and is difficult to realize large-scale continuous production.

According to the search, the following patent literatures related to the present application are found and specifically disclosed below.

1. Method for preparing crisp persimmon slices and persimmon crisps prepared by the method (Invention Patent No.: ZL ZL20121004148.1, Authorization Date: Sep. 11, 2013) disclose a method for preparing persimmon crisps, which adopts a process design of peeling, slicing and de-astringency. The method has advantages of simplifying operation process, shortening processing time, improving de-astringency effect, not only retaining nutrients of fresh fruits, but also adding no additive by means of quick-freezing and refrigeration treatment after de-astringency, and thus eliminating the use of chemical substances harmful to human bodies. The method has disadvantages that: (1) the de-astringency is performed in a manner of hot-water soaking and spraying treatment, causing uneven de-astringency of inner layers and outer layers, relatively long treatment time and low efficiency; (2) the drying uniformity is difficult to control so that the appearance quality varies greatly; and (3) the drying time is relatively long so that large-scale continuous production is hard to realize.

2. Method for preparing dried persimmons (Invention Patent No.: ZL20171044132.1, Publication Date: Sep. 22, 2017) discloses a method for preparing dried persimmons, which comprises steps of pretreatment, primary drying, fermentation, baking, secondary drying, seasoning, tertiary drying and packaging. The method has the advantages that the method is simple and capable of performing batch operation; the obtained dried persimmons are fruity, crispy and refreshing; deeply processed products of the persimmons in the market are increased to increase the economic income by 8.9%; the sliced persimmons are soaked in a low-temperature ascorbic acid solution to promote tannin in the persimmons to be converted into water-insoluble tannin, thereby diluting astringency, preventing the persimmons from browning, and increasing the content of nutrients in the persimmons; and the persimmons are freeze-dried after soaking, to reduce the moisture content at low temperature, dilute astringency, avoid becoming soft and rotting, and facilitate subsequent processing. The method has disadvantages that: (1) intermittent drying treatment is performed three times so that the drying time is relatively long; (2) the low-temperature ascorbic acid soaking de-astringency treatment has no significant de-astringency effect; and (3) the soaked persimmons are freeze-dried so that the drying time is relatively long and the requirements for equipment are relatively high.

3. Method for vacuum microwave processing of persimmon crisps (Invention Patent No.: ZL20171095947.9, Publication Date: Mar. 2, 2018) discloses a method of vacuum microwave processing of persimmon crisps. The method has the advantages of capability of effectively reducing nutrition loss of the persimmons, high production efficiency, low cost, rich nutrients, good taste and the like. The processing method comprises a step of performing segmented microwave puffing drying on the persimmon slices under the vacuum degree of −0.09 to −0.06 MPa. The method has disadvantages that: (1) the problem of browning of the persimmon slices during slicing is not solved; (2) the processing technology fails to remove astringency of the persimmons and has relatively high requirements for persimmon raw materials; (3) although the drying time is greatly shortened, technical problems of great difference in drying uniformity and obvious difference in apparent quality of the slices still exist; and (4) the processing mode needs to realize precise control of vacuum degree and segmented puffing, which is complicated and difficult to realize.

SUMMARY OF PRESENT INVENTION

Purposes of the present invention are to overcome defects of the prior art and provide a technology for three-dimensional microwave air-jet drying of persimmon slices with good drying effect and high efficiency.

The present invention solves the technical problems by adopting the technical solution below.

A method for three-dimensional microwave air-jet drying of persimmon slices comprises the following steps:

(1) grading and cleaning: selecting and cleaning fresh, complete and pest-free hard persimmons;

(2) peeling: peeling the hard persimmons and removing pedicels by a manual peeling method;

(3) slicing: vertically cutting each peeled hard persimmon into two halves first, and then slicing with a water jet cutter to obtain 4-5 mm thick persimmon slices, wherein an anti-browning aqueous solution is used for slicing, the anti-browning aqueous solution contains an aqueous solution prepared from 0.5% NaCl+1% vitamin C+0.5% citric acid, and persimmon pieces are cut with the water jet cutter formed by a high-pressure micro-gun head;

(4) microwave heating: spreading the persimmon slices on a mesh-like tray, placing the mesh-like tray in a device with ultrasonic waves for treating for 3 min, wherein the ultrasonic wave power is 1500 W;

(5) vapor de-astringency: using 10% citric acid and 40% ethanol as de-astringency liquid for de-astringency at temperature of 60-70° C. and pressure of 0.3-0.4 MPa, annularly spraying de-astringency liquid vapor at 360° around the persimmon slices at a rotation speed of 2-3 rad/min, and performing de-astringency operation for 8-10 min;

(6) hot-air reverse primary drying: performing hot-air reverse 360° rotary drying for 35-40 min at the rotation speed of 2-3 rad/min, wherein the temperature of hot air is 70-80° C.;

(7) negative pressure intermittent secondary drying: placing the persimmon slices in the device with ultrasonic waves again, evacuating the device, and performing intermittent drying for 15 min at a vacuum degree of −0.10 to −0.12 MPa and an ultrasonic wave power of 1000 W until the moisture content is less than 10%;

(8) cooling and packaging: taking out the dried persimmon slices, cooling to room temperature, and then performing nitrogen-filled packaging to obtain dried persimmon slices.

Moreover, the cutting speed is 230-350 mm/min; the diameter of a water nozzle is 0.46 mm; the diameter of an abrasive nozzle is 1.6 mm; and the jet pressure is 210 MPa.

The present invention has the advantages and positive effects below.

1. In a water jet cutter cutting process adopted by the present invention, the normal force is greater than the tensile stress between persimmon cells to cause fracture; and meanwhile, the jet cutting also has a permeation effect. As shown in FIG. 1, cutting with a knife may directly damage cell walls to cause outflow of cell sap and microbial putrefaction, growth and browning; but water jet can cut between the cells and break the cells by destroying the tensile stress between the cells due to permeation capability and flexibility, thereby effectively inhibiting browning, maintaining integrity of the cells and realizing zero loss of nutrients. In addition, a natural anti-browning aqueous solution is used to replace clear water to form the water jet cutter through the high-pressure micro-gun head; and a layer of water film is formed on cut surfaces of the fruit pieces after completing the cutting, wherein the water film has effects of oxygen isolation and color protection, and can effectively inhibit surface browning.

2. A microwave tunnel drying way adopted in the present invention can dry a large number of persimmon slices simultaneously. The persimmon raw materials directly act with microwaves, so that polar molecules (water molecules and the like) in persimmon cells and between the persimmon cells absorb the microwaves, and change original molecular structures under the action of the microwaves to present directional arrangement. The polar molecules are subject to polar motion with the change of an external electromagnetic field, and friction collision at the same speed (the motion speed of polar molecules under microwaves of 915 MHz is 915 million times/second) as a microwave frequency to generate heat energy, so that the temperature of the interiors of the persimmon slices rapidly rises in a short time to achieve the heating effect; the drying uniformity is good; and the energy saving efficiency is high.

3. In the present invention, high-temperature (60-70° C.) high-pressure annularly sprayed citric acid and 40% alcohol vapor (rotating at 360°) are adopted to remove astringency of persimmons, wherein high temperature causes more intense Brownian motion of liquid molecules; high pressure improves permeation and diffusion speed of the de-astringency liquid in the persimmon slices; citric acid plays a membrane breaking role on persimmon cell membranes; and 40% alcohol vapor is allowed to rapidly diffuse into the cells, so that tannin is polymerized into insoluble gel from a soluble state, thereby achieving a uniform and rapid de-astringency effect.

4. A microwave tunnel way is adopted to heat and dry in the present invention. Hot air and mixed vapor of high-temperature citric acid and 40% alcohol move at 360° towards each other to form convective vortex and accelerate moisture loss. A three-phase coupled drying way is adopted so that the surface vaporization rate and the internal moisture migration rate of the persimmons are greatly increased and are relatively consistent, thereby greatly improving the drying efficiency, shortening the drying time, realizing better rehydration property and shrinkage uniformity, and correspondingly improving apparent quality.

DETAILED DESCRIPTION OF PREFERRED EMBODIMENTS

The present invention will be further described in detail with reference to accompanying drawings through specific embodiments. The following embodiments are only illustrative and not restrictive, and shall not be used to limit the protection scope of the present invention.

With the continuous expansion of persimmon planting areas in China, the yield of persimmons is constantly increased. However, the persimmons are relatively high in moisture content and not easy to store. The persimmons in the market are mainly fresh-eaten and processed into dried persimmons, so that the persimmons are single in variety and cannot satisfy taste and needs of consumers. Therefore, it is urgent to perform profound processing on the persimmons. Persimmon slices are loved and sought after by the consumers due to rich nutrients, excellent taste, long storage period and other advantages and characteristics. However, the production of the dried persimmon slices is mostly limited in family kitchens; and the industrial production starts late. The purposes of the present invention are to provide a set of rapid batch drying method for persimmon slices with good shrinkage uniformity and without browning and solve the critical technical problems.

A method for three-dimensional microwave air-jet drying of persimmon slices comprises the following steps:

(1) Grading and cleaning: selecting and cleaning fresh, complete and pest-free hard persimmons;

(2) Peeling: peeling the hard persimmons and removing pedicels by a manual peeling method;

(3) Slicing: vertically cutting each peeled hard persimmon into two halves first, and then slicing with a water jet cutter, wherein the persimmon slices are preferably 4-5 mm thick; to prevent the fruits from oxidative browning in contact with air, color protection measures should be taken in the slicing process; therefore, ultra-high-pressure water-jet cutting technology is adopted to cut the hard persimmons; a broad-spectrum natural anti-browning aqueous solution is prepared, containing an aqueous solution prepared from 0.5% NaCl+1% vitamin C+0.5% citric acid; the water jet cutter formed by a high-pressure micro-gun head is adopted to cut persimmon pieces; the solution can be recycled; the cutting thickness is 5-6 mm; the cutting speed is 230-350 mm/min; the diameter of a water nozzle is 0.46 mm; the diameter of an abrasive nozzle is 1.6 mm; the jet pressure is 210 MPa; and a layer of water film is formed on cut surfaces of the fruit pieces after completing the cutting, wherein the water film has effects of oxygen isolation and color protection, and can effectively inhibit surface browning.

An ultra-high-pressure water jet cutter cutting technology is adopted to slice the persimmons, thereby inhibiting browning and maintaining cell integrity and nutrition; high-pressure water is adopted to clean and grind the cut surfaces while cutting; in addition, a natural anti-browning aqueous solution is used to replace clear water to form the water jet cutter through the high-pressure micro-gun head, so that the layer of water film is formed on the cut surfaces of the fruit pieces after completing the cutting; and the water film has effects of oxygen isolation and color protection, and can effectively inhibit surface browning.

(4) Microwave heating: spreading the persimmon slices on a mesh-like tray, placing the mesh-like tray in a microwave tunnel, and rapidly heating interiors and exteriors of the persimmons for 3 min under a microwave power of 1500 W;

(5) Vapor de-astringency: using 10% citric acid and 40% ethanol as de-astringency liquid, annularly spraying de-astringency liquid vapor (rotating at 360° at a rotation speed of 2-3 rad/min) at high temperature (60-70° C.) and high pressure (0.3-0.4 MPa), and performing de-astringency operation for 8-10 min.

A 360° rotary spraying de-astringency technology (gas fumigation) of mixed vapor of high-temperature high-pressure citric acid and 40% alcohol is used to improve the diffusion and permeation effect of the de-astringency liquid, greatly improve the de-astringency uniformity and shorten the operation time of de-astringency.

(6) Hot-air reverse primary drying: performing hot-air reverse 360° rotary drying for 35-40 min at the rotation speed of 2-3 rad/min, wherein the temperature of hot air is 70-80° C.

A microwave tunnel drying way is adopted to increase the internal temperature of the persimmons and accelerate the internal moisture migration; the external heating air (60-70° C.) is used for reversely rotating and drying at 360° to increase the surface moisture vaporization rate and realize relatively uniform internal and external moisture loss, so that the persimmons have good shrinkage uniformity and high apparent quality.

(7) Negative-pressure intermittent secondary drying: placing the persimmon slices in the device with ultrasonic waves again, evacuating the device, and performing intermittent drying for 15 min at a vacuum degree of $-0.10$ to $-0.12$ MPa and a microwave power of 1000 W until the moisture content is less than 10%.

A microwave tunnel way is adopted to heat and dry; hot air and mixed vapor of high-temperature citric acid and 40% alcohol move 360° towards each other to form convective vortex and accelerate moisture loss; a three-phase coupled drying way is adopted to greatly improve the drying efficiency and greatly shorten the drying time.

The microwave tunnel drying and the hot-air reverse 360° rotary drying are adopted to improve the persimmon drying uniformity and correspondingly improve the rehydration property.

(8) Cooling and packaging: taking out the dried persimmon slices, cooling to room temperature, and then performing nitrogen-filled packaging to obtain dried persimmon slices.

We claim:

1. A method for three-dimensional microwave air-jet drying of persimmon slices, comprising the following steps:
   (1) selecting and cleaning fresh, complete and pest-free persimmons;
   (2) peeling the persimmons and removing pedicels by a manual peeling method;
   (3) vertically cutting each peeled persimmon into two halves first, and then slicing with a water jet cutter to obtain 4-5 mm thick persimmon slices, wherein an anti-browning aqueous solution is used for slicing, the anti-browning aqueous solution contains an aqueous solution prepared from 0.5% NaCl+1% vitamin C+0.5% citric acid, and persimmon pieces are cut with the water jet cutter formed by a pressurized gun head;
   (4) spreading the persimmon slices on a mesh tray, placing the mesh tray in a microwave tunnel oven for 3 min at 1500W;
   (5) using 10% citric acid and 40% ethanol as de-astringency liquid for de-astringency at temperature of 60-70° C. and pressure of 0.3-0.4 MPa, annularly spraying de-astringency liquid vapor at 3600 around the persimmon slices at a rotation speed of 2-3 rad/min in a first rotary direction, and performing de-astringency operation for 8-10 min;
   (6) performing hot-air rotary drying on the persimmon slices for 35-40 min at the rotation speed of 2-3 rad/min in a second rotary direction which is reverse to the first rotary direction, wherein the temperature of the hot air is 70-80° C.;

(7) placing the persimmon slices in the microwave tunnel oven again, evacuating the microwave tunnel oven, and drying the persimmon slices for 15 min at 1000W and a vacuum degree of −0.10 to −0.12 MPa until the moisture content of each persimmon slice is less than 10%;

(8) taking out the dried persimmon slices, cooling the dried persimmon slices, and then performing nitrogen-filled packaging to obtain packaged dried persimmon slices.

2. The method for three-dimensional microwave air-jet drying of persimmon slices according to claim 1, wherein the cutting speed is 230-350 mm/min; the diameter of a water nozzle is 0.46 mm; the diameter of an abrasive nozzle is 1.6 mm; and the jet pressure is 210 MPa.

* * * * *